(12) United States Patent
Guo et al.

(10) Patent No.: US 10,334,309 B2
(45) Date of Patent: Jun. 25, 2019

(54) BULLET SCREEN DISPLAY METHOD AND APPARATUS

(71) Applicant: TENCENT TECHNOLOGY (SHENZHEN) COMPANY LIMITED, Shenzhen, Guangdong (CN)

(72) Inventors: Junhai Guo, Shenzhen (CN); Zijian Zhuang, Shenzhen (CN); Yulei Shi, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 4 days.

(21) Appl. No.: 15/559,709

(22) PCT Filed: Apr. 21, 2016

(86) PCT No.: PCT/CN2016/079895
§ 371 (c)(1),
(2) Date: Sep. 19, 2017

(87) PCT Pub. No.: WO2017/008551
PCT Pub. Date: Jan. 19, 2017

(65) Prior Publication Data
US 2018/0255346 A1    Sep. 6, 2018

(30) Foreign Application Priority Data
Jul. 13, 2015  (CN) .......................... 2015 1 0410252

(51) Int. Cl.
*H04N 21/431* (2011.01)
*H04N 21/45* (2011.01)
(Continued)

(52) U.S. Cl.
CPC ..... *H04N 21/4316* (2013.01); *G06F 16/9577* (2019.01); *H04N 21/2187* (2013.01); *H04N 21/475* (2013.01); *H04N 21/4858* (2013.01); *H04N 21/4884* (2013.01); *H04N 21/8133* (2013.01)

(58) Field of Classification Search
CPC .............. H04N 21/20; H04N 21/4884; H04N 21/0882; H04N 21/2355; H04N 21/44008; H04N 21/4856; H04N 21/4888; H04N 21/4316; H04N 21/8133; H04N 21/4858;
(Continued)

(56) References Cited

U.S. PATENT DOCUMENTS

8,858,313 B1 * 10/2014 Selfors .................. A63F 13/335
463/42
2013/0007576 A1 * 1/2013 Lund .................. H04N 21/4307
715/203
(Continued)

*Primary Examiner* — Pankaj Kumar
*Assistant Examiner* — Alazar Tilahun
(74) *Attorney, Agent, or Firm* — Sughrue Mion, PLLC (57) ABSTRACT

A bullet screen display method and apparatus are provided. The method includes loading a web page that satisfies the Hypertext Markup Language 5 (HTML5) Protocol, the web page including a video tag and a text track tag, and loading and displaying an online video, based on the video tag. The method further includes loading a web video text tracks (WebVTT) file, based on the text track tag, and displaying bullet screen information on the online video, based on the WebVTT file.

15 Claims, 6 Drawing Sheets

(51) Int. Cl.

| | |
|---|---|
| *H04N 21/47* | (2011.01) |
| *H04N 21/81* | (2011.01) |
| *H04N 21/21* | (2011.01) |
| *G06F 16/95* | (2019.01) |
| *G06F 16/957* | (2019.01) |
| *H04N 21/2187* | (2011.01) |
| *H04N 21/475* | (2011.01) |
| *H04N 21/485* | (2011.01) |
| *H04N 21/488* | (2011.01) |

(58) Field of Classification Search
CPC .............. H04N 21/2187; H04N 21/475; G06F 16/9577
See application file for complete search history.

(56) References Cited

U.S. PATENT DOCUMENTS

2013/0055121 A1* 2/2013 Cho .................. G09G 5/00
 715/764
2013/0219444 A1* 8/2013 Kitazato ............ H04N 21/4305
 725/110

* cited by examiner

FIG. 9

BULLET SCREEN DISPLAY METHOD AND APPARATUS

CROSS-REFERENCE TO RELATED APPLICATION

This application is a U.S. national stage application under 35 U.S.C. § 371 of International Application No. PCT/CN2016/079895, filed on Apr. 21, 2016, in the Chinese Patent Office, which claims priority from Chinese Patent Application No. 201510410252.6, entitled "BULLET SCREEN DISPLAY METHOD AND APPARATUS," filed on Jul. 13, 2015, in the Chinese Patent Office, the disclosures of which are incorporated herein by reference in their entireties.

BACKGROUND

1. Field

Methods and apparatuses consistent with example embodiments relate to multimedia display, and in particular, to a bullet screen display method and apparatus.

2. Description of Related Art

A bullet screen display system is a display manner of displaying a large quantity of user comments on a video in a rolling caption form during video display.

On current online video websites, a bullet screen function is usually provided by using a Flash program. When a user accesses an online video website by using a browser, the browser loads and runs a Flash program, and the Flash program obtains bullet screen information and displays, in a superimposed manner, the bullet screen information on the online video.

The existing technology has at least several problems.

First, due to insecurity of the Flash program, lots of browsers do not support running of the Flash program any more. Consequently, bullet screen information cannot be normally displayed in the browsers.

Secondly, although a bullet screen function can be achieved by using an independent application on an operating system that does not support the Flash program, the independent application needs to be adapted to multiple models, and a large quantity of researches and developments on independent applications are needed. The independent applications cannot be widely used and have relatively high research and development costs.

Thirdly, an implementation manner of attaching bullet screen information onto a web page node further exists in the existing technology. However, because the bullet screen information does not directly act on the online video itself, once the online video is played in full screen, display of the bullet screen information fails.

SUMMARY

According to example embodiments, there is provided a bullet screen display method, the method including loading a web page that satisfies the Hypertext Markup Language 5 (HTML5) Protocol, the web page including a video tag and a text track tag, and loading and displaying an online video, based on the video tag. The method further includes loading a web video text tracks (WebVTT) file, based on the text track tag, and displaying bullet screen information on the online video, based on the WebVTT file.

According to example embodiments, there is provided a bullet screen display apparatus, the apparatus including a memory storing instructions; and a processor configured to execute the instructions to implement a web page loading module configured to load a web page that satisfies the Hypertext Markup Language 5 (HTML5) Protocol, the web page including a video tag and a text track tag, and a video display module configured to load and display an online video, based on the video tag. The processor is further configured to execute the instructions to implement a file loading module configured to load a web video text tracks (WebVTT) file, based on the text track tag, and a bullet screen display module configured to display bullet screen information on the online video, based on the WebVTT file.

According to example embodiments, there is provided a non-transitory computer-readable storage medium storing program code including instructions for causing a computer to load a web page that satisfies the Hypertext Markup Language 5 (HTML5) Protocol, the web page including a video tag and a text track tag, and load and display an online video, based on the video tag. The instructions are further for causing the computer to load a web video text tracks (WebVTT) file, based on the text track tag, and display bullet screen information on the online video, based on the WebVTT file.

DESCRIPTION OF EXAMPLE EMBODIMENTS

To make the objectives, technical solutions, and advantages of the present disclosure clearer, implementations of the present disclosure will be further described in detail below with reference to the accompanying drawings.

The HTML5 Protocol has been supported by an overwhelming majority of current browsers.

In the HTML5, a video tag <video> and a text track tag <track> are provided. The video tag <video> is used to embed an online video into an HTML5 page, and the text track tag <track> is used to add a caption to a video element. The caption is a static caption, and may be displayed on the online video in a form such as a title, a common caption, a description, or a chapter.

However, in example embodiments of the present disclosure, display of a dynamic bullet screen is implemented based on secondary development by the basic attribute of the text track tag <track>.

Figure 1:
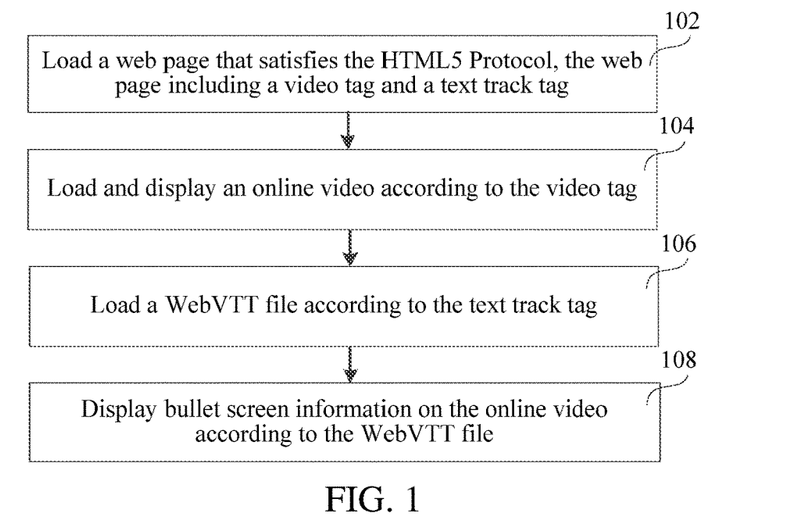
FIG. 1 is a method flowchart of a bullet screen display method according to example embodiments.

FIG. 1 is a method flowchart of a bullet screen display method according to example embodiments. These example embodiments are described by using the bullet screen display method applied to a browser supporting the HTML5 Protocol as an example, and the browser may run in an electronic device.

In step 102, a web page that satisfies the HTML5 Protocol is loaded, the web page including a video tag and a text track tag.

The browser may load a web page satisfying the HTML5 Protocol from a server.

In step 104, an online video according to the video tag is loaded and displayed.

In step 106, a WebVTT file according to the text track tag is loaded.

WebVTT is a file format, and is used to mark an external text track. The external text track may be generated by the server according to comment information of other users on an online video.

In step 108, bullet screen information is displayed on the online video according to the WebVTT file.

The browser may display bullet screen information on the online video, according to a text track in the WebVTT file.

Based on the above, according to the bullet screen display method provided in these example embodiments, a WebVTT file may be loaded by using a text track tag provided by the HTML5 Protocol, and bullet screen information is displayed on an online video according to the WebVTT file, so that the problem that bullet screen information cannot be displayed when a browser does not support a Flash program is resolved. Accordingly, bullet screen information is displayed on the online video by using the HTML5 Protocol that has been supported by most browsers without an independent application for bullet screen display implementation, which needs only a web page satisfying the HTML5 Protocol. In addition, the bullet screen display implementation may not be affected by whether the online video is displayed in full screen.

Figure 2:
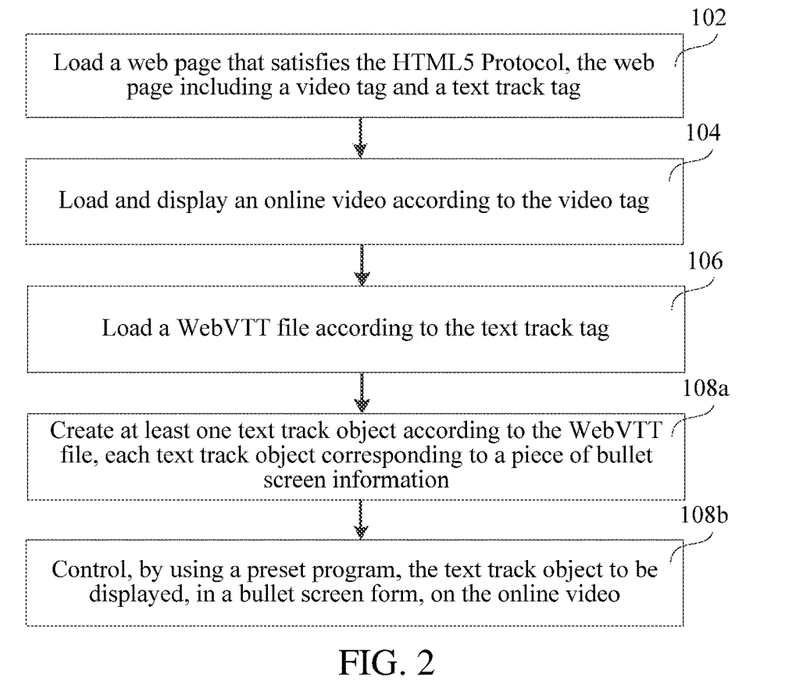
FIG. 2 is a method flowchart of a bullet screen display method according to example embodiments.

In example embodiments, step 108 is alternatively implemented into the following two steps, as shown in FIG. 2.

FIG. 2 is a method flowchart of a bullet screen display method according to example embodiments.

In step 108*a*, at least one text track object according to the WebVTT file is created, each text track object corresponding to a piece of bullet screen information.

The bullet screen information may be comment information of other users and/or a current user on the online video.

In step 108*b*, by using a preset program, the text track object to be displayed is controlled, in a bullet screen form, on the online video.

Optionally, the preset program may be a Java program in the web page satisfying the HTML5 Protocol.

Based on the above, the basic attribute the text track tag <track> provided by the HTML5 may be displaying a caption at a fixed position, and rolling display of captions cannot be implemented. However, in these example embodiments, text track information in a WebVTT file is created as a text track object, and the text track object is controlled, by using a preset program, to move, so that the text track information is displayed on an online video in a bullet screen form.

Figure 3:
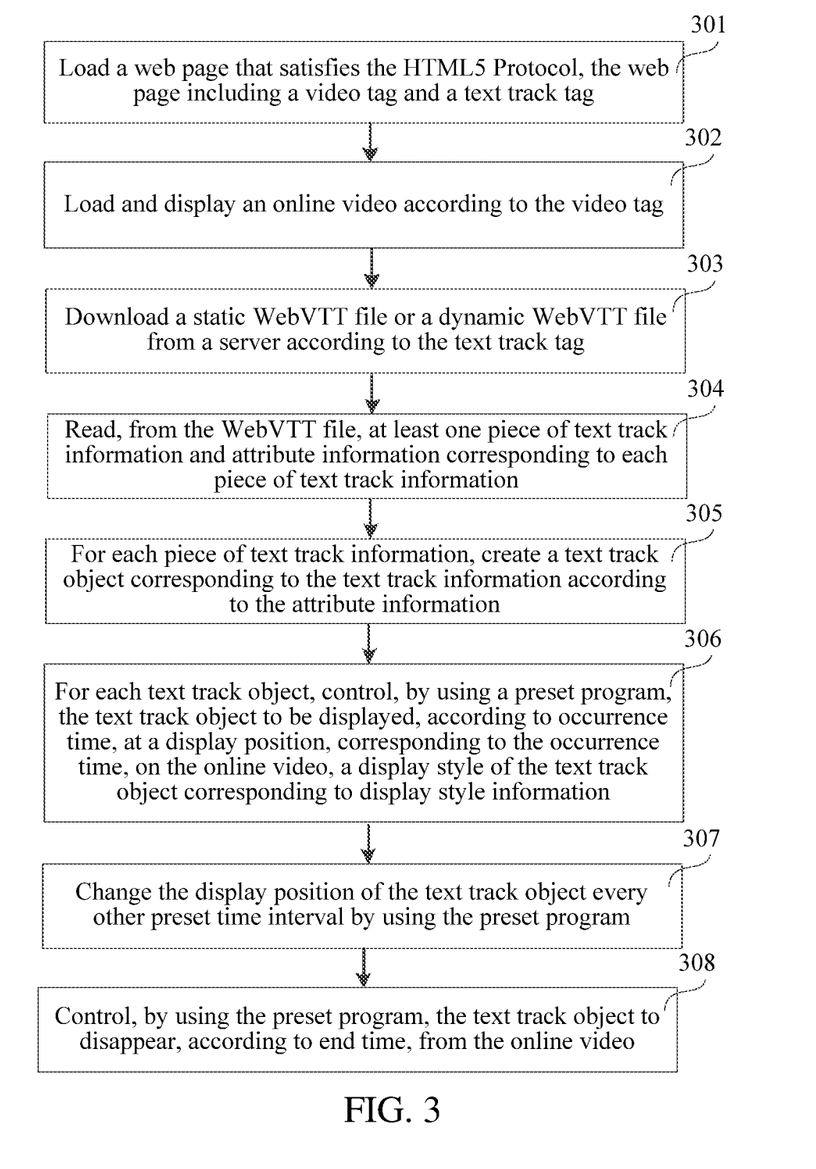
FIG. 3 is a method flowchart of a bullet screen display method according to example embodiments.

FIG. 3 is a method flowchart of a bullet screen display method according to example embodiments. These example embodiments are described by using the bullet screen display method applied to a browser supporting the HTML5 Protocol as an example, and the browser may run in an electronic device.

In step 301, a web page that satisfies the HTML5 Protocol is loaded, the web page including a video tag and a text track tag.

A user may install a browser on a terminal. The browser may support multiple protocols, including the HTML5 Protocol. The user can watch an online video (or may be referred to as a web page video) by using the browser. When wanting to watch an online video, the user may open the browser, and then may enter a website corresponding to the online video, or click an icon corresponding to the online video, to open a web page corresponding to the online video. The web page may be a web page satisfying the HTML5 Protocol. The web page includes a video tag. The video tag may include information such as a video source address, the height of the video, and the width of the video.

The web page further includes a text track tag, which is used to load a WebVTT file from a server.

In step 302, an online video according to the video tag is loaded and displayed.

The browser may obtain video data of the online video from the server according to the video source address in the video tag, and may determine the size of a display range of the video data by information such as the height of the video and the width of the video in the video tag, to display the online video in the web page satisfying the HTML5 Protocol.

When displaying the online video, the browser may display the online video according to the height and the width in the video tag.

In step 303, a static WebVTT file or a dynamic WebVTT file is downloaded from a server according to the text track tag.

The browser further loads a WebVTT file from the server according to the text track tag.

WebVTT files may be classified into two types: static WebVTT files and dynamic WebVTT files.

A static WebVTT file is generated in advance by the server according to historical comment information corresponding to the online video.

A dynamic WebVTT file is generated by the server according to comment information corresponding to the online video played this time. That is, each time the server receives a piece of comment information about the online video, the server may use the comment information as a piece of text track information, and add same into the dynamic WebVTT file, and the browser may obtain the dynamic WebVTT file once every other preset time interval. Optionally, the WebVTT obtained each time may include text track information corresponding to all comment information within a most recent time interval.

In step 304, from the WebVTT file, at least one piece of text track information and attribute information corresponding to each piece of text track information are read.

The browser reads, from the WebVTT file, at least one piece of text track information and attribute information corresponding to each piece of text track information. The attribute information may be set by a technical person, or may be set by the user when the user watching the online video.

For example, a piece of text track information may include "what is this heroine's name?"

The attribute information may include any one or any combination of display style information, display time information, and display position information.

The display style information may include any one or any combination of a font size, a font color, a font type, a font frame, a frame type, a transparency, a shadow, a background picture, and a text arrangement manner.

For example, the font type may be regular script; the font color may be black; the font size may be four, the font frame may be a rounded rectangular line box; the transparency may be 80%; there may be no shadow; there may be no background picture; text may be longitudinally arranged.

The display time information may include at least occurrence time and end time. Optionally, the display time information may further include middle time or a preset time interval.

For example, when the occurrence time is play time "00:31" of the current online video, the end time may be play time "00:36" of the current online video. The middle time may include "00:32, 00:33, 00:34, and 00:35," or the preset time interval may be 0.2 second.

The display position information may include either one or both of a display position represented by a row number and/or a column number and a display position represented by a percentage, and there may be one display position corresponding to the occurrence time.

For example, a play position corresponding to the occurrence time may be a leftmost side of a second row in a display window of the current online video; and a play position corresponding to the end time may be a rightmost side of the second row in the display window of the current online video.

For another example, a play position corresponding to the occurrence time may be a leftmost side of a position 40% downwards from an upper edge of the display window of the current online video; the 40% may be 40% of a distance between the upper edge and a lower edge; and a play position corresponding to the end time may be a rightmost side of the position 40% downwards from the upper edge of the display window of the current online video.

Optionally, a corresponding processing process for setting the attribute information when the user watches the online video may be as follows: a setting message of the user for the attribute information is received, the setting message carrying any one or any combination of target display style information, target display time information, and target display position information; and the attribute information is set according to the setting message; and the text track object is displayed based on the set attribute information.

The attribute information may include any one or any combination of the display style information, the display time information, and the display position information. An option for setting the attribute information may be disposed in the page of the online video. The user may select the target display style information, the target display time information, and the target display position information that the user hopes to use when watching the online video. For example, the user may set the font type to regular script, set the font color to green, and set the text to be longitudinally arranged. After the user sets the attribute information, the terminal may receive the setting message of the user for the attribute information, the setting message carrying any one or any combination of the target display style information, the target display time information, and the target display position information. The terminal may set the attribute information according to the setting message, and during subsequent display of the text track object, the terminal may display the text track object based on the set attribute information.

Because various pieces of text track information of a same online video may use same display position information, in the WebVTT file, display position information may be set in batches for n pieces of text track information by using a batch processing object.

For example, by using a Region object, display positions of the n pieces of text track information may be all set as follows: the play position corresponding to the occurrence time is the leftmost side of the second row in the display window of the current online video; and the play position corresponding to the end time is the rightmost side of the second row in the display window of the current online video.

For another example, by using the Region object, display positions of another n pieces of text track information may be all set as follows: the play position corresponding to the occurrence time is the leftmost side of a third row in the display window of the current online video; and the play position corresponding to the end time is a rightmost side of a fourth row in the display window of the current online video.

In step 305, for each piece of text track information, a text track object corresponding to the text track information according to the attribute information is created.

For each piece of text track information in the WebVTT file, the text track object corresponding to the text track information is created according to the attribute information corresponding to the text track information.

The text track object is an object that can be newly created, deleted and operated. A newly created text track object may include information such as start time and end time.

Moreover, because the text track object can be operated by a preset program, the text track object may implement a rolling display effect.

In step 306, for each text track object, by using a preset program, the text track object to be displayed is controlled, according to occurrence time, at a display position, corresponding to the occurrence time, on the online video, a display style of the text track object corresponding to display style information.

The preset program may be a Java program carried in the web page satisfying the HTML5 Protocol.

The Java program can control each text track object to be displayed, according to respective occurrence time, on the online video, and an occurrence position on the online video is a display position corresponding to the occurrence time. A display style of each text track object corresponds to corresponding display style information, that is, styles such the font size and the font type correspond to the corresponding display style information.

In step 307, the display position of the text track object is changed every other preset time interval by using the preset program.

For each text track object, the Java program may further change the display position of the text track object every other preset time interval. The preset time interval may be a predetermined time interval, or may be a time interval indicated in the display time information.

For example, for each text track object, the Java program may move the text track object rightwards by a preset length every other 0.2 second.

In step 308, by using the preset program, the text track object is controlled to disappear, according to end time, from the online video.

For each text track object, the Java program may further control the text track object to disappear, according to the end time, from the online video.

Occurrence time of each text track object may be the same or different, to implement bullet screen display.

Based on the above, according to the bullet screen display method provided in these example embodiments, a WebVTT file is loaded by using a text track tag provided by the HTML5 Protocol, and bullet screen information is displayed on an online video according to the WebVTT file, so that the problem that bullet screen information cannot be displayed when a browser does not support a Flash program is resolved. Accordingly, bullet screen information is displayed on the online video by using the HTML5 Protocol that has been supported by most browsers without an independent application for bullet screen display implementation, which needs only a web page satisfying the HTML5 Protocol. In addition, the bullet screen display implementation may not be affected by whether the online video is displayed in full screen.

According to the bullet screen display method provided in these example embodiments, each piece of text track information in the WebVTT file is further created into a text track object, and then the text track object is operated by using a preset program, to change a display position, to display common static text in a bullet screen form. The bullet screen form is a display form in which multiple text track objects are separately displayed on the online video in a rolling display manner.

Moreover, because the web page satisfying the HTML5 Protocol may be displayed in full screen, the foregoing bullet screen display method can further implement bullet screen display when the online video is displayed in full screen.

Because a splash screen bug may occur when a first text track object is displayed, as an optional step, before step 305, an empty text track object may be created as the first text track object by using a preset program. Because content of the empty text track object is empty, a splash screen bug may not be triggered, and then subsequent text track objects may be created according to the text track information in the WebVTT file for display. The first text track object may be used to eliminate a first splash screen bug.

Figure 4:
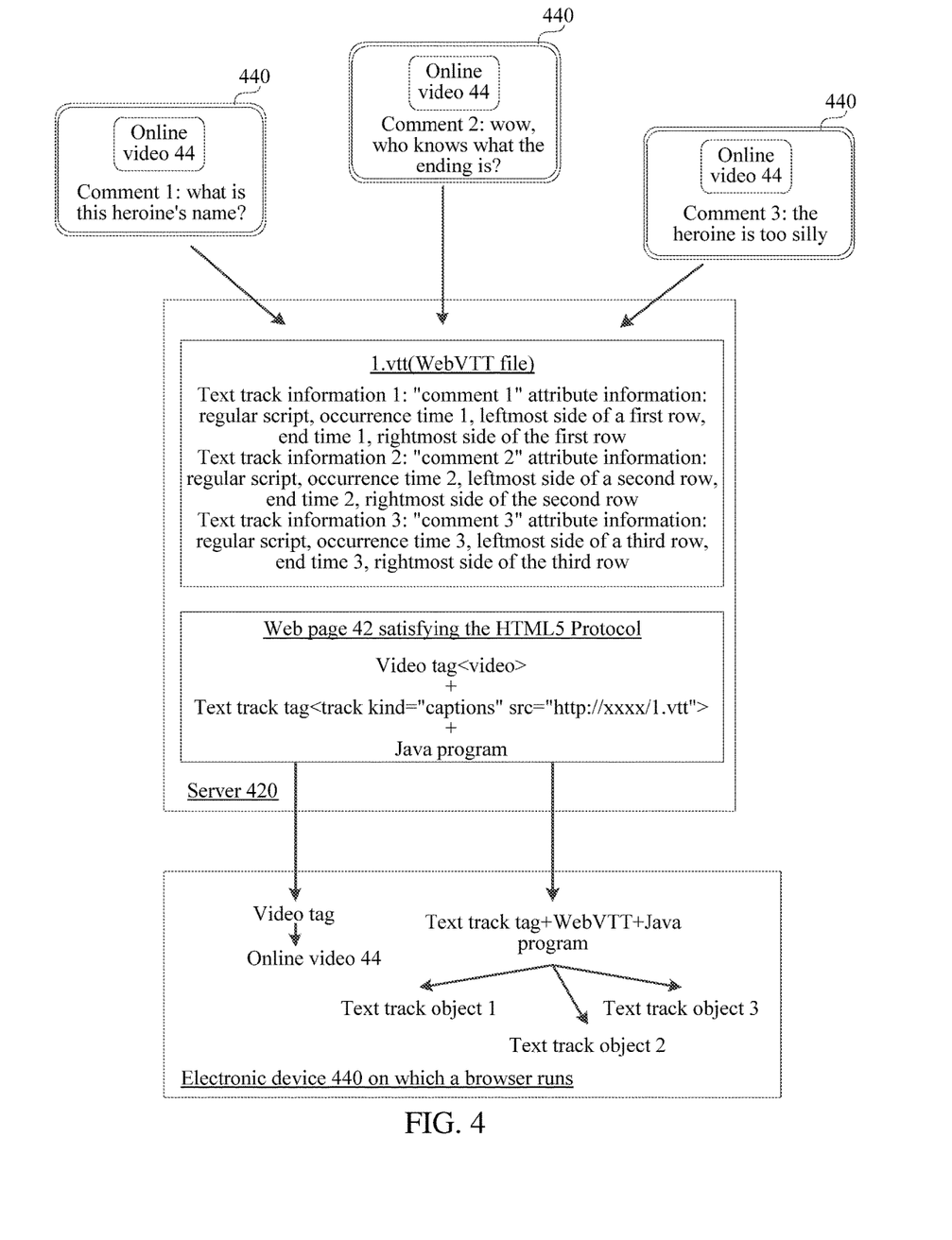
FIG. 4 is a schematic diagram of implementation of the bullet screen display method according to the example embodiments of FIG. 3.

FIG. 4 is a schematic diagram of implementation of the bullet screen display method according to the example embodiments of FIG. 3. A server 420 provides a web page 42 satisfying the HTML5 Protocol to electronic devices 440 of users (including a current user and other users). Browsers in these electronic devices 440 load the web page 42 satisfying the HTML5 Protocol, and display an online video 44 according to a video tag in the web page In a process of watching the online video 44, each user can publish comment information in the web page 42. The server 420 receives the comment information sent by each user, and generates, in real time, a WebVTT file according to the comment information. A file name of the WebVTT file may be 1.vtt. Then, each electronic device 440 loads the WebVTT file from the server 420 by using a text track tag in a process of playing the online video 44, creates or converts the text track information in the WebVTT file into a text track object by using a Java program in the web page 42, and operates the Java program to display the text track object in the WebVTT file to be displayed, in a bullet screen form, on the online video 44.

Figure 5:
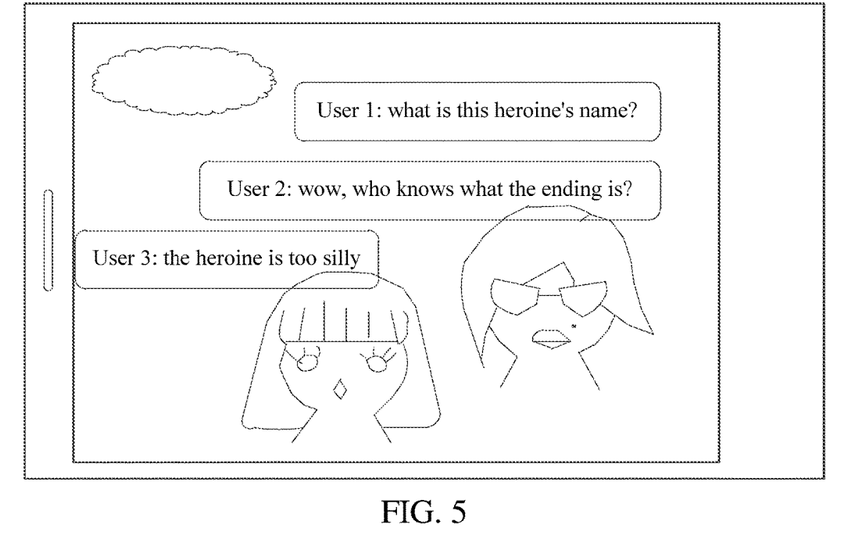
FIG. 5 is a schematic diagram of an interface during implementation of the bullet screen display method according to the example embodiments of FIG. 3.

FIG. 5 is a schematic diagram of an interface during implementation of the bullet screen display method according to the example embodiments of FIG. 3. Referring to FIG. 5, the text track object is displayed, in the bullet screen form, on the online video 44.

Figure 6:
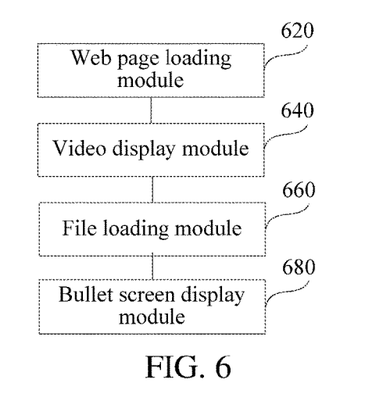
FIG. 6 is a structural block diagram of a bullet screen display apparatus according to example embodiments.

FIG. 6 is a structural block diagram of a bullet screen display apparatus according to example embodiments. The bullet screen display apparatus may be implemented into all or a part of an electronic device by using software, hardware, or a combination thereof. A browser supporting and satisfying the HTML5 Protocol runs in the electronic device. The apparatus includes a web page loading module 620, a video display module 640, a file loading module 660, and a bullet screen display module 680.

The web page loading module 620 is configured to load a web page that satisfies the HTML5 Protocol, the web page including a video tag and a text track tag;

The video display module 640 is configured to load and display an online video according to the video tag;

The file loading module 660 is configured to load a WebVTT file according to the text track tag.

The bullet screen display module 680 is configured to display bullet screen information on the online video according to the WebVTT file.

Based on the above, according to the bullet screen display apparatus provided in these example embodiments, a WebVTT file is loaded by using a text track tag provided by the HTML5 Protocol, and bullet screen information is displayed on an online video according to the WebVTT file, so that the problem that bullet screen information cannot be displayed when a browser does not support a Flash program is resolved. Accordingly, bullet screen information is displayed on the online video by using the HTML5 Protocol that has been supported by most browsers without an independent application for bullet screen display implementation, which needs only a web page satisfying the HTML5 Protocol. In addition, the bullet screen display implementation may not be affected by whether the online video is displayed in full screen.

Figure 7:
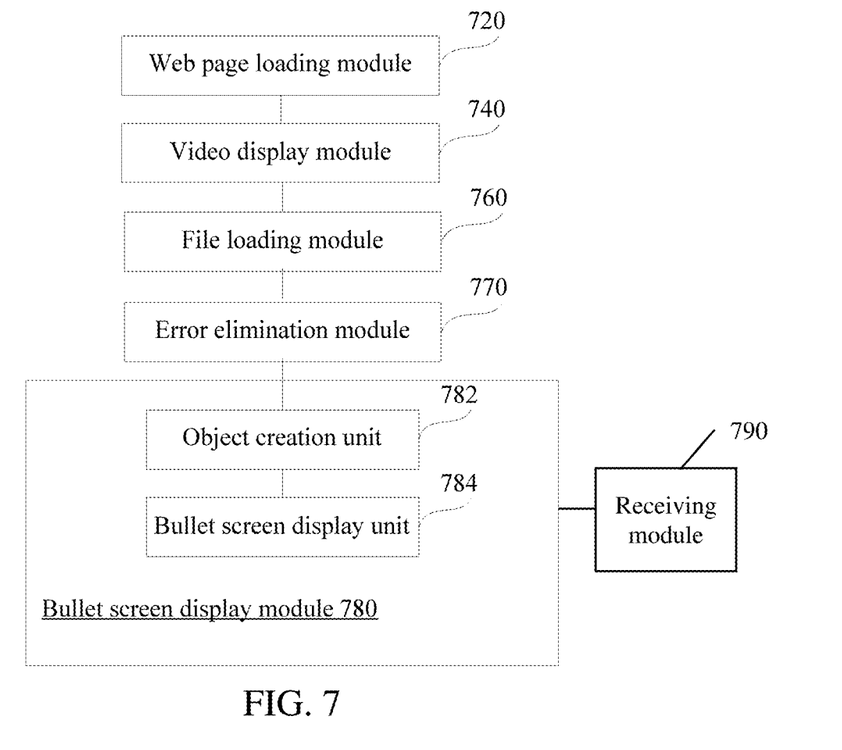
FIG. 7 is a structural block diagram of a bullet screen display apparatus according to example embodiments.

FIG. 7 is a structural block diagram of a bullet screen display apparatus according to example embodiments. The bullet screen display apparatus may be implemented into all or a part of an electronic device by using software, hardware, or a combination thereof. A browser supporting and satisfying the HTML5 Protocol runs in the electronic device. The apparatus includes a web page loading module 720, a video display module 740, a file loading module 760, and a bullet screen display module 780.

The web page loading module 720 is configured to load a web page that satisfies the HTML5 Protocol, the web page including a video tag and a text track tag;

The video display module 740 is configured to load and display an online video according to the video tag;

The file loading module 760 is configured to load a WebVTT file according to the text track tag.

The bullet screen display module 780 is configured to display bullet screen information on the online video according to the WebVTT file.

Optionally, the bullet screen display module 780 may include an object creation unit 782 and a bullet screen display unit 784.

The object creation unit 782 may be configured to create at least one text track object according to the WebVTT file, each text track object corresponding to a piece of bullet screen information.

The bullet screen display unit 784 may be configured to control, by using a preset program, the text track object to be displayed, in a bullet screen form, on the online video.

Figure 8:
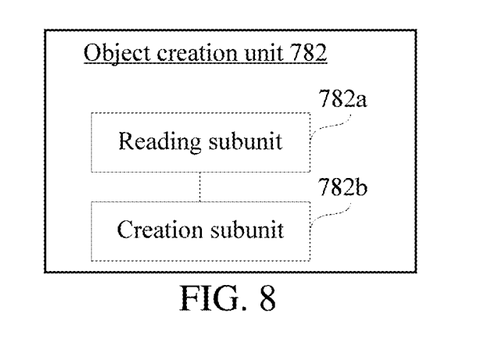
FIG. 8 is a structural block diagram of a bullet screen display apparatus according to example embodiments.

FIG. 8 is a structural block diagram of a bullet screen display apparatus according to example embodiments. Optionally, the object creation unit 782 may include a reading subunit 782a and a creation subunit 782b.

The reading subunit 782*a* may be configured to read, from the WebVTT file, at least one piece of text track information and attribute information corresponding to each piece of text track information, the attribute information including any one or any combination of display style information, display time information, and display position information.

The creation subunit 782*b* may be configured to, for each piece of text track information, create a text track object corresponding to the text track information, according to the attribute information.

The display style information may include any one or any combination of a font size, a font color, a font type, a font frame, a frame type, a transparency, a shadow, and a background picture; the display time information may include at least occurrence time and end time; and the display position information may include either one or both of a display position represented by a row number and/or a column number and a display position represented by a percentage, one display position corresponding to the occurrence time.

Referring again to FIG. 7, optionally, the bullet screen display unit 784 may be configured to control, by using the preset program, the text track object to be displayed, according to the occurrence time, at the display position, corresponding to the occurrence time, on the online video, a display style of the text track object corresponding to the display style information. The bullet screen display unit 784 may be further configured to change the display position of the text track object every other preset time interval by using the preset program, and control, by using the preset program, the text track object to disappear, according to the end time, from the online video.

Optionally, the file loading module 760 may be configured to load a static WebVTT file from a server according to the text track tag, the static WebVTT file being generated in advance by the server according to historical comment information corresponding to the online video. Alternatively, the file loading module 760 may be configured to load a dynamic WebVTT file from a server according to the text track tag, the dynamic WebVTT file being generated by the server according to comment information corresponding to the online video played this time.

Optionally, the apparatus may further include an error elimination module 770 and a receiving module 790.

The error elimination module 770 may be configured to create an empty text track object as a first text track object, the first text track object being used to eliminate a first splash screen bug.

The receiving module 790 may be configured to receive a setting message of a user for the attribute information, the setting message carrying any one or any combination of target display style information, target display time information, and target display position information.

In these example embodiments, the bullet screen display module 780 may be configured to set the attribute information according to the setting message, and display the text track object based on the set attribute information.

Based on the above, according to the bullet screen display apparatus provided in these example embodiments, a WebVTT file is loaded by using a text track tag provided by the HTML5 Protocol, and bullet screen information is displayed on an online video according to the WebVTT file, so that the problem that bullet screen information cannot be displayed when a browser does not support a Flash program is resolved. Accordingly, bullet screen information is displayed on the online video by using the HTML5 Protocol that has been supported by most browsers without an independent application for bullet screen display implementation, which needs only a web page satisfying the HTML5 Protocol. In addition, the bullet screen display implementation may not be affected by whether the online video is displayed in full screen.

According to the bullet screen display apparatus provided in these example embodiments, each piece of text track information in the WebVTT file is further created into a text track object, and then the text track object is operated by using a preset program, to change a display position, to display common static text in a bullet screen form. The bullet screen form is a display form in which multiple text track objects are separately displayed on the online video in a rolling display manner.

Moreover, because the web page satisfying the HTML5 Protocol may be displayed in full screen, the foregoing bullet screen display apparatus can further implement bullet screen display when the online video is displayed in full screen.

The above functional modules are only described for example purposes when the bullet screen display apparatus provided by the foregoing example embodiments displays bullet screen information. In actual applications, the functions may be allocated to different functional modules according to needs, i.e., the internal structure of the device may be divided to different functional modules to complete all or some of the above described functions. In addition, the bullet screen display apparatuses provided by the foregoing example embodiments are based on the same concept as the bullet screen display methods in the foregoing example embodiments. For the implementation process, refer to the method example embodiments, and the details are not described herein again.

Figure 9:
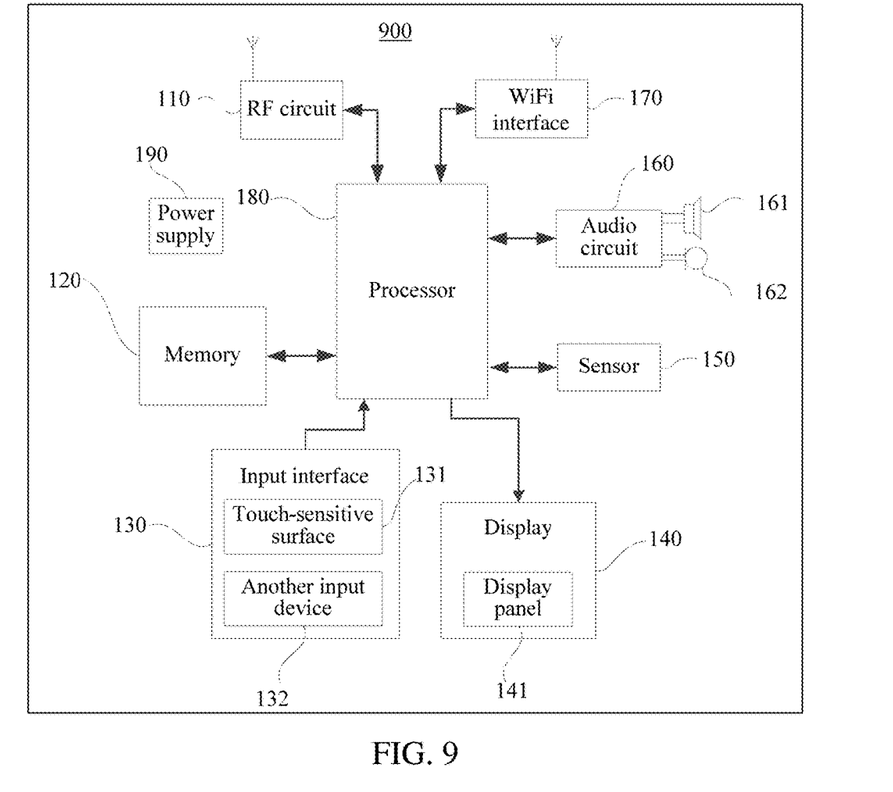
FIG. 9 is a structural block diagram of a terminal according to example embodiments.

FIG. 9 is a schematic structural diagram of a terminal 900 according to example embodiments. The terminal 900 can be configured to implement the bullet screen display methods provided in the foregoing example embodiments.

The terminal 900 may include a radio frequency (RF) circuit 110, a memory 120 including one or more computer readable storage media, an input interface 130, a display 140, a sensor 150, an audio circuit 160, a wireless fidelity (WiFi) interface 170, a processor 180 including one or more processing cores, and a power supply 190. A person skilled in the art may understand that the structure of the terminal 900 shown in FIG. 9 does not constitute a limitation to the terminal 900, and the terminal 900 may include more components or fewer components than those shown in the figure, or some components may be combined, or a different component deployment may be used.

The RF circuit 110 may be configured to receive and send signals during an information receiving and sending process or a call process. The RF circuit 110 receives downlink information from a base station, then delivers the downlink information to one or more processors 180 for processing, and sends related uplink data to the base station. The RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program used by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, to provide access of the processor 180 and the input interface 130 to the memory 120.

The input interface 130 may be configured to receive input digit or character information, and generate a keyboard, mouse, joystick, optical, or track ball signal input related to the user setting and function control. The input interface 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input interface 130 may further include the other input device 132. The another input device 132 may include, but is not limited to, one or more of a physical keyboard, a functional key (such as a volume control key or a switch key), a track ball, a mouse, and a joystick.

The display 140 may be configured to display information input by the user or information provided for the user, and various graphical user interfaces of the terminal 900. The graphical user interfaces may be formed by a graph, a text, an icon, a video, or any combination thereof. The display 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface, the touch-sensitive surface 131 transfers the touch operation to the processor 180, to determine the type of the touch event. Then, the processor 180 provides a corresponding visual output on the display panel 141 according to the type of the touch event. Although, in FIG. 9, the touch-sensitive surface 131 and the display panel 141 are used as two separate parts to implement input and output functions, in example embodiments, the touch-sensitive surface 131 and the display panel 141 may be integrated to implement the input and output functions.

The terminal 900 may further include at least one sensor 150 such as an optical sensor, a motion sensor, and other sensors. The optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravity acceleration sensor can detect magnitude of accelerations in various directions (e.g., on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 900, are not further described herein.

The audio circuit 160, a speaker 161, and a microphone 162 may provide audio interfaces between the user and the terminal 900. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 900.

WiFi is a short distance wireless transmission technology. The terminal 900 may help, by using the WiFi interface 170, the user to receive and send emails, browse a web page, access streaming media, and so on, which provides wireless broadband Internet access for the user. Although FIG. 9 shows the WiFi interface 170, it may be understood that the WiFi module 1007 is not a necessary component of the terminal 900, and the health monitoring device may be omitted as long as the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include one or more processing cores. The processor 180 may integrate an application processor and a modem. The application processor mainly processes an operating system, a user interface, an application program, and the like. The modem mainly processes wireless communication. It may be understood that the foregoing modem may either not be integrated into the processor 180.

The terminal 900 further includes the power supply 190 (such as a battery) for supplying power to the components. The power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

The terminal 900 may further include a camera, a Bluetooth module, and the like, which are not further described herein. In these example embodiments, the display unit of the terminal 900 is a touchscreen display, and the terminal 900 further includes a memory and one or more programs. The one or more programs are stored in the memory and configured to be executed by one or more processors. The one or more programs contain instructions used for performing the following operations: loading a web page that satisfies the HTML5 Protocol, the web page including a video tag and a text track tag; loading and displaying an online video according to the video tag; loading a WebVTT file according to the text track tag; and displaying bullet screen information on the online video according to the WebVTT file.

Optionally, the step of displaying bullet screen information on the online video according to the WebVTT file may include: creating at least one text track object according to the WebVTT file, each text track object corresponding to a piece of bullet screen information; and controlling, by using a preset program, the text track object to be displayed, in a bullet screen form, on the online video.

Optionally, the step of creating at least one text track object according to the WebVTT file may include: reading, from the WebVTT file, at least one piece of text track information and attribute information corresponding to each piece of text track information, the attribute information including any one or any combination of display style information, display time information, and display position information; and for each piece of text track information, creating a text track object corresponding to the text track information according to the attribute information.

The display style information may include any one or any combination of: a font size, a font color, a font type, a font frame, a frame type, a transparency, a shadow, and a background picture; the display time information may include at least occurrence time and end time; and the display position information includes either one or both of a display position represented by a row number and/or a column number and a display position represented by a percentage, one display position corresponding to the occurrence time.

Optionally, the step of controlling, by using a preset program, the text track object to be displayed, in a bullet screen form, on the online video may include: controlling, by using the preset program, the text track object to be displayed, according to the occurrence time, at the display position, corresponding to the occurrence time, on the online video, a display style of the text track object corresponding to the display style information; changing the display position of the text track object every other preset time interval by using the preset program; and controlling, by using the preset program, the text track object to disappear, according to the end time, from the online video.

Optionally, the step of loading a WebVTT file according to the text track tag may include: loading a static WebVTT file from a server according to the text track tag, the static WebVTT file being generated in advance by the server according to historical comment information corresponding to the online video; or loading a dynamic WebVTT file from a server according to the text track tag, the dynamic WebVTT file being generated by the server according to comment information corresponding to the online video played this time.

Optionally, before the step of creating at least one text track object according to the WebVTT file, the method may further include creating an empty text track object as a first text track object, the first text track object being used to eliminate a first splash screen bug.

Optionally, the method may further include: receiving a setting message of a user for the attribute information, the setting message carrying any one or any combination of target display style information, target display time information, and target display position information; and setting the attribute information according to the setting message, and displaying the text track object based on the set attribute information.

The sequence numbers of the foregoing example embodiments of the present disclosure are for the convenience of description, and do not imply the preference among the example embodiments.

A person of ordinary skill in the art may understand that all or some of the steps of the foregoing example embodiments may be implemented by using hardware, or may be implemented by a program instructing relevant hardware. The program may be stored in a computer readable storage medium. The storage medium may be a read-only memory, a magnetic disk, an optical disc, or the like.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The foregoing descriptions are example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A bullet screen display method, the method comprising:
   loading a web page that satisfies an Hypertext Markup Language 5 (HTML5) Protocol, the web page comprising a video tag and a text track tag;
   loading and displaying an online video, based on the video tag;
   loading a web video text tracks (WebVTT) file, based on the text track tag;
   creating an empty text track object of which content is empty, as a first text track object among a plurality of text track objects, so that a splash screen bug is not triggered when the first text object is displayed;
   creating one or more text track objects different than the empty text track object, among the plurality of text track objects, based on the WebVTT file, each of the one or more text track objects corresponding to a piece of bullet screen information; and
   controlling, using a preset program, the plurality of text track objects comprising the empty text track object and the one or more text track objects, to be displayed in a bullet screen form on the online video.

2. The method according to claim 1, wherein the creating the one or more text track objects comprises:
   reading, from the WebVTT file, one or more pieces of text track information and attribute information corresponding to each of the one or more pieces of the text track information, the attribute information comprising display style information, display time information, and display position information; and
   for each of the one or more pieces of the text track information, creating a text track object corresponding to a respective piece of the text track information, based on the attribute information,
   wherein the display style information comprises a font size, a font color, a font type, a font frame, a frame type, a transparency, a shadow, and a background picture,
   wherein the display time information comprises an occurrence time and an end time, and
   wherein the display position information comprises a display position represented by a row number, a column number and a percentage, the display position corresponding to the occurrence time.

3. The method according to claim 2, wherein the controlling the plurality of text track objects to be displayed comprises:
   controlling, using the preset program, the text track object to be displayed, based on the occurrence time, at the display position corresponding to the occurrence time, on the online video, a display style of the text track object corresponding to the display style information;
   changing, using the preset program, the display position of the text track object at every other preset time interval; and
   controlling, using the preset program, the text track object to disappear from the online video, at the end time.

4. The method according to claim 1, wherein the loading the WebVTT file comprises:
   loading a static WebVTT file from a server, based on the text track tag, the static WebVTT file being generated in advance by the server, based on historical comment information corresponding to the online video; or
   loading a dynamic WebVTT file from the server, based on the text track tag, the dynamic WebVTT file being generated by the server, based on comment information corresponding to the online video that is currently played.

5. The method according to claim 2, further comprising:
   receiving a setting message of a user for the attribute information, the setting message carrying target display style information, target display time information, and target display position information;
   setting the attribute information, based on the setting message; and
   displaying the text track object, based on the set attribute information.

6. The method according to claim 1, wherein the bullet screen information comprises comment information of users on the online video.

7. A bullet screen display apparatus, the apparatus comprising:
   a memory storing instructions; and
   a processor configured to execute the instructions to:
      load a web page that satisfies an Hypertext Markup Language 5 (HTML5) Protocol, the web page comprising a video tag and a text track tag;
      load and display an online video, based on the video tag;
      load a web video text tracks (WebVTT) file, based on the text track tag;
      create an empty text track object of which content is empty, as a first text track object among a plurality of text track objects, so that a splash screen bug is not triggered when the first text object is displayed;
      create one or more text track objects different than the empty text track object, among the plurality of text track objects, based on the WebVTT file, each of the one or more text track objects corresponding to a piece of bullet screen information; and
      control, using a preset program, the plurality of text track objects comprising the empty text track object and the one or more text track objects, to be displayed in a bullet screen form on the online video.

8. The apparatus according to claim 7, wherein the processor is further configured to execute the instructions:
   read, from the WebVTT file, one or more pieces of text track information and attribute information corresponding to each of the one or more pieces of the text track information, the attribute information comprising display style information, display time information, and display position information; and
   for each of the one or more pieces of the text track information, create a text track object corresponding to a respective piece of the text track information, based on the attribute information,
   wherein the display style information comprises a font size, a font color, a font type, a font frame, a frame type, a transparency, a shadow, and a background picture,
   wherein the display time information comprises an occurrence time and an end time, and
   wherein the display position information comprises a display position represented by a row number, a column number and a percentage, the display position corresponding to the occurrence time.

9. The apparatus according to claim 8, wherein the processor is further configured to execute the instructions to:
   control, using the preset program, the text track object to be displayed, based on the occurrence time, at the display position corresponding to the occurrence time, on the online video, a display style of the text track object corresponding to the display style information;
   change, using the preset program, the display position of the text track object at every other preset time interval; and control, using the preset program, the text track object to disappear from the online video, at the end time.

10. The apparatus according to claim 7, wherein the processor is further configured to execute the instructions to:
load a static WebVTT file from a server, based on the text track tag, the static WebVTT file being generated in advance by the server, based on historical comment information corresponding to the online video; or
load a dynamic WebVTT file from to the server, based on the text track tag, the dynamic WebVTT file being generated by the server, based on comment information corresponding to the online video that is currently played.

11. The apparatus according to claim 8, wherein the processor is further configured to execute the instructions to:
receive a setting message of a user for the attribute information, the setting message carrying target display style information, target display time information, and target display position information;
set the attribute information, based on the setting message; and
display the text track object, based on the set attribute information.

12. The apparatus according to claim 7, wherein the bullet screen information comprises comment information of users on the online video.

13. A non-transitory computer-readable storage medium storing program code comprising instructions for causing a computer to:
load a web page that satisfies an Hypertext Markup Language 5 (HTML5) Protocol, the web page comprising a video tag and a text track tag;
load and display an online video, based on the video tag;
load a web video text tracks (WebVTT) file, based on the text track tag;
create an empty text track object of which content is empty, as a first text track object among a plurality of text track objects, so that a splash screen bug is not triggered when the first text object is displayed;
create one or more text track objects different than the empty text track object, among the plurality of text track objects, based on the WebVTT file, each of the one or more text track objects corresponding to a piece of bullet screen information; and
control, using a preset program, the plurality of text track objects comprising the empty text track object and the one or more text track objects, to be displayed in a bullet screen form on the online video.

14. The non-transitory computer-readable storage medium according to claim 13, wherein the instructions are further for causing the computer to:
read, from the WebVTT file, one or more pieces of text track information and attribute information corresponding to each of the one or more pieces of the text track information, the attribute information comprising display style information, display time information, and display position information; and
for each of the one or more pieces of the text track information, create a text track object corresponding to a respective piece of the text track information, based on the attribute information,
wherein the display style information comprises a font size, a font color, a font type, a font frame, a frame type, a transparency, a shadow, and a background picture,
wherein the display time information comprises an occurrence time and an end time, and
wherein the display position information comprises a display position represented by a row number, a column number and a percentage, the display position corresponding to the occurrence time.

15. The non-transitory computer-readable storage medium according to claim 14, wherein the instructions are further for causing the computer to:
control, using the preset program, the text track object to be displayed, based on the occurrence time, at the display position corresponding to the occurrence time, on the online video, a display style of the text track object corresponding to the display style information;
change, using the preset program, the display position of the text track object at every other preset time interval; and
control, using the preset program, the text track object to disappear from the online video, at the end time.

* * * * *